UNITED STATES PATENT OFFICE.

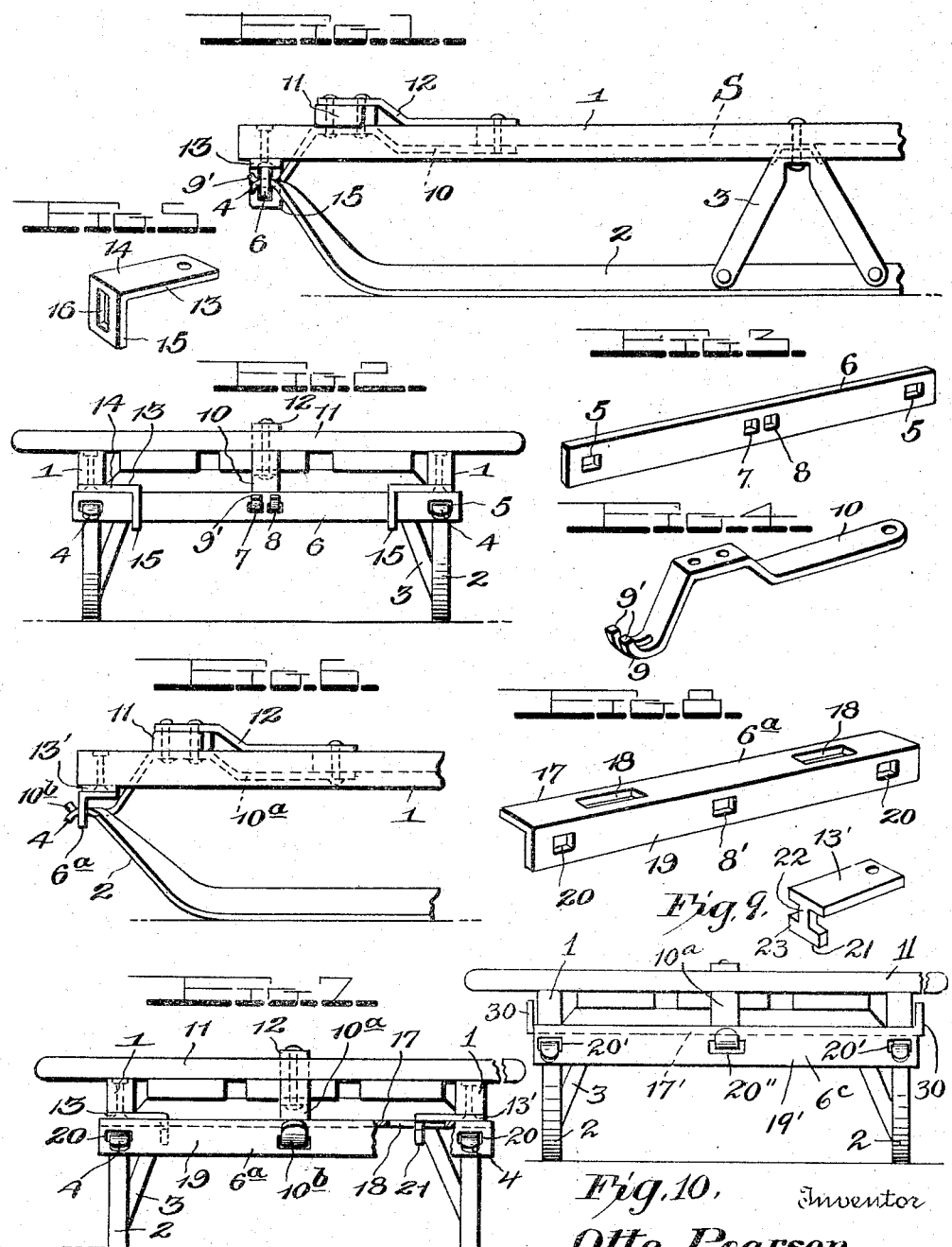

OTTO PEARSON, OF MOUNT JEWETT, PENNSYLVANIA.

RUNNER AND SIDE-RAIL CONNECTOR FOR FLEXIBLE SLEDS.

1,192,223.  Specification of Letters Patent.  Patented July 25, 1916.

Application filed January 17, 1916. Serial No. 72,585.

*To all whom it may concern:*

Be it known that I, OTTO PEARSON, a subject of the King of Sweden, residing at Mount Jewett, in the county of McKean and State of Pennsylvania, have invented certain new and useful Improvements in Runner and Side-Rail Connectors for Flexible Sleds; and I do declare the following to be a full, clear, and exact description of the invention, such as will enable others skilled in the art to which it appertains to make and use the same.

This invention relates to improvements in steerable sleds and more particularly to the connections between the runners and the side rails or raves of the sled.

The main object of the invention is to so construct a sled having flexible runners that the cross bar usually employed for connecting the front ends of the raves of sleds of this character may be dispensed with and yet all danger of the ends of the runner-connecting cross bar becoming engaged with the raves on the flexing of the runners and thereby held against return to normal position is prevented.

Another object is to provide such a connection whereby the runner-connecting cross bar will be so held as to prevent its disengagement from the runners or the turning thereof should the steering bar break or be otherwise disconnected from said cross bar.

Still another object is to provide a connection of this character which will limit the steering radius and thus prevent breakage of the runners which might result from a sharp bending thereof.

With these and other objects in view, the invention consists of certain novel features of construction, combination and arrangement of parts to be hereinafter more particularly described and claimed.

In the accompanying drawings: Figure 1 represents a side elevation of a portion of a flexible hand sled equipped with one form of this improved connector; Fig. 2 is a front end view thereof; Fig. 3 is a detail perspective view of the runner-connecting cross bar; Fig. 4 is a similar view of the steering bar; Fig. 5 is a similar view of one of the members which connect the side rails with the cross bar; Fig. 6 is a detail side elevation of the front end of a portion of a sled showing another form of this invention applied; Fig. 7 is a front end view thereof with parts broken out; Fig. 8 is a detail perspective view of the cross bar employed in this form of the invention; Fig. 9 is a similar view of one of the connecting elements employed between the side rails and the cross bar; Fig. 10 is a front end view showing still another form of the invention applied.

In the embodiment illustrated in Figs. 1 to 5, a hand sled is shown having the usual side bars or raves 1 and runners 2 connected with said side bars by the usual knees 3 at points spaced from the front of the sled as shown clearly in Fig. 1. The runners 2 which may be of any desired cross sectional contour, are provided at their front ends with suitable hooks 4 which are designed to be engaged with apertures 5 formed in the opposite ends of a runner-connecting cross bar 6. This cross bar 6 is provided midway its ends with two apertures 7 and 8 arranged adjacent each other and which are designed to receive the forked end 9 of a steering bar 10. This steering bar 10 is pivotally connected at one end with the seat S of the sled and has its free bifurcated front ends offset downwardly and slotted longitudinally to form the tines 9' of the fork, said tines being bent to form suitable hooks for engagement with the apertures 7 and 8 of the cross bar 6, whereby said steering bar is connected with the runner-connecting cross bar. A handle or operating bar 11 is mounted on the steering bar 10, being here shown secured thereto at the offset portion thereof and which is arranged between said steering bar and a bracing link 12, the inner or rear end of which is connected with the seat by the same pivot which connects the bar 10 thereto (see Fig. 1).

The side rails 1 project at their front ends beyond the front end of the seat S and are designed to be supported on the cross bar 6 and slidably engaged therewith by means of angle irons 13 which are here shown L-shaped with the free end of the long arms 14 thereof pivotally connected with the front ends of the side rails on the lower faces thereof and are adapted to extend inwardly in planes at right angles to said rails, as is shown clearly in Fig. 2. The short arms 15 of these L-shaped connecting members 13 are apertured as shown at 16 to receive the ends of the cross bar 6, said apertures conforming in shape to the cross sectional contour of the cross bar, and in this form of the invention they are shown as rectangular slots to receive the cross bar 6 which is rectangular in cross section, being in the form of a straight metal bar. The cross bar 6 corresponds substantially in length to the distance between the side rails 1 of the sled, and the openings 5 therein with which the hook-shaped ends 4 of the runners are engaged, are disposed in vertical alinement with the pivots which connect the angle irons 13 with the side rails. (See Fig. 2.) In assembling these parts, the short slotted arms 15 of the angle irons 13 are disposed downwardly and extended toward each other, being arranged in alinement to receive the opposite ends of the cross bar 6 which after being inserted in the slots 16 thereof, are engaged with the hooked ends 4 of the runners. The hooked end 9 of the steering bar 10 which is here shown bifurcated, is then engaged with the apertures 7 and 8 at the center of the cross bar, and said steering bar is pivotally connected at its inner or rear end with the seat or body of the sled. When so disposed, it will be obvious that the cross bar 6 serves to support the front ends of the side rails and thereby strengthens the sled structure, while the angle irons 13 carried by said side rails serve to connect the cross bar with said rails and prevent all possibility of its turning or becoming detached from the hooked-shaped ends of the runners should the steering bar be broken or be otherwise disengaged from the cross bar. The angle irons 13 which are primarily intended to slidingly connect the cross bar 6 with the side rails and prevent all possibility of its becoming lockingly engaged with said side rails on the shifting or flexing of the runners 2, also perform the function of limiting means for controlling the steering or bending movement of said runners, whereby breakage of the runners by sharp bending thereof is obviated.

It will be understood that when the cross bar 6 is moved laterally by the operator in either direction, that one of the sled runners, after having been moved laterally the length of the log arm 14 of one of the angle irons 13, will abut the depending short arm thereof and thus limit the further lateral movement of the runners, and that the cross bar will also be held by said irons 13 against any tendency to rise upwardly relatively to the side rails and thereby prevent them from becoming lockingly engaged with said side rails, thus insuring the safety of the rider. It will also be understood that this connection of the side rails with the runner-connecting cross bar 6, by means of the short angle irons 13, decreases the cost of manufacture of the sled by dispensing with the usual side-rail connecting cross bar.

In the form shown in Figs. 6 to 9, the runner-connecting cross bar $6^a$ is shown in the form of an angle iron, one flange 17 of which is arranged horizontally and provided with longitudinally spaced slots 18 for a purpose to be described. The other flange 19 of this angle bar $6^a$ extends downwardly at right angles to the flange 17 and is provided at its opposite ends with runner-receiving apertures 20, here shown rectangular in form to receive the correspondingly shaped hooks 4 of the runners 2. In this form of the invention, the connectors which unite the side rails 1 with the cross bar $6^a$ are shown in the form of bars 13' which are provided at one end with laterally extending T-shaped arms 21, the shanks 22 of which are adapted to slidably engage with the slots 18 of the horizontal flange 17 of the cross bar $6^a$, while the heads 23 of said arms are adapted to extend under and engage the lower face of the flange 17 on opposite sides of the slots 18, it being understood that when these members 13' are engaged with the cross bars, that the heads 23 thereof are arranged longitudinally in the slots 18 to permit their insertion therethrough, and then turned to connect them with the cross bar. The other ends of these connectors 13' are pivotally connected with the front ends of the rails 1 in the same manner as the members 13 are connected in the form above described, said connectors 13' extending normally at right angles to the ends of the side rails on the inner faces thereof. The slots 18 formed in the flange 17 of the cross bar $6^a$ are of such a length that when the connectors 13' are engaged therewith, and the runners in normal straight position, the arms 21 of said members will be disposed midway the length of said slots to provide for the movement of the cross bar longitudinally in either direction a predetermined distance before becoming engaged with said connectors. The length of the slots 18 thus controls the extent of movement of the cross bar relatively to the side rails, thereby limiting the flexing movement of the runners to prevent them from being bent so sharply as to cause breakage thereof. The steering bar $10^a$ in this form is the same as that above described except that the free front end thereof is formed in a single piece as shown at $10^b$ instead of being bifurcated, and is adapted to be inserted in the aperture 8' of bar $6^a$.

In the form shown in Fig. 10, the sled is similar in construction to that shown in Figs. 6 to 9, the only difference residing in the runner-connecting cross bar and the means for holding it in slidable engagement with the side rails. This cross bar $6^c$ is made in the form of an angle iron similar to the angle iron $6^a$ of Figs. 6 to 9, except that the horizontal flange 17' thereof is imperforate throughout its length and is extended at its opposite ends beyond the opposite ends of the depending flange 19', and said ends are bent upwardly at right angles to form abutments 30 which are designed to engage the outer faces of the front ends of the side rails 1 as is shown clearly in Fig. 10. The depending flange 19' is provided at its opposite ends with runner receiving apertures 20', and at its center with a steering bar receiving aperture 20" with which the hook-like end of the steering bar 10ª is designed to be engaged, as is shown clearly in Fig. 10.

When the parts are in operative position as shown in Fig. 10, the front ends of the side rails 1 rest on the horizontal flange 17' of the cross bar 6ᶜ with their outer faces engaged with the upstanding flanges or abutments 30, said abutments being here shown slightly lower than the width of the side rails. These abutments 30 serve to prevent the cross bar 6ᶜ from passing inward beyond the lower faces of the side rails and becoming lockingly engaged therewith, and it will be obvious that when the cross bar is shifted for steering the sled, that one of these abutments only will engage one of the side rails, and consequently one rail only will be bent during the flexing of the runners, according to the direction in which said runners are turned.

The advantages accruing from the various constructions have been pointed out during the specific description of the various forms, and consequently a more detailed description of the operation of the various forms is not deemed necessary.

I claim as my invention:

1. In a sled, the combination with a cross bar connecting the front ends of flexible runners, and side rails; of elements carried by one of said members and engaging the other for preventing said cross bar from interlockingly engaging the side rails on the flexing of the runners.

2. In a sled having flexible runners, the combination with a runner-connecting cross bar and side rails, of connectors for said side rails and cross bar carried by one of said members and movably engaged with the other.

3. In a sled having flexible runners, the combination with a runner-connecting cross bar and side rails, of connectors for said side rails and cross bar carried by one of said members and movably engaged with the other, said connectors and cross bar having coöperating means for limiting the flexing of the runners.

4. In a sled having flexible runners, the combination with a runner-connecting cross bar and side rails, of connectors for said side rails and cross bar carried by one of said members, said connectors and cross bar being one apertured to receive the other to provide for the movement of one relatively to the other.

5. In a sled having flexible runners, the combination with a runner-connecting cross bar and side rails, of connectors for said side rails and cross bar carried by said side rails and apertured to slidably receive said cross bar.

6. In a sled having flexible runners, the combination with a runner-connecting cross bar and side rails, of L-shaped connectors connected at one end to said side rails and extending laterally inward therefrom with their other ends depending and apertured to receive said cross bar.

In testimony whereof I have hereunto set my hand in presence of two subscribing witnesses.

OTTO PEARSON.

Witnesses:
SEXTUS LUNDBERG,
ROBT OBERG.

Copies of this patent may be obtained for five cents each, by addressing the "Commissioner of Patents, Washington, D. C."